Nov. 20, 1928.
S. W. BOGGS
DRAWING DEVICE
Filed Oct. 11, 1926
1,692,326
2 Sheets-Sheet 1
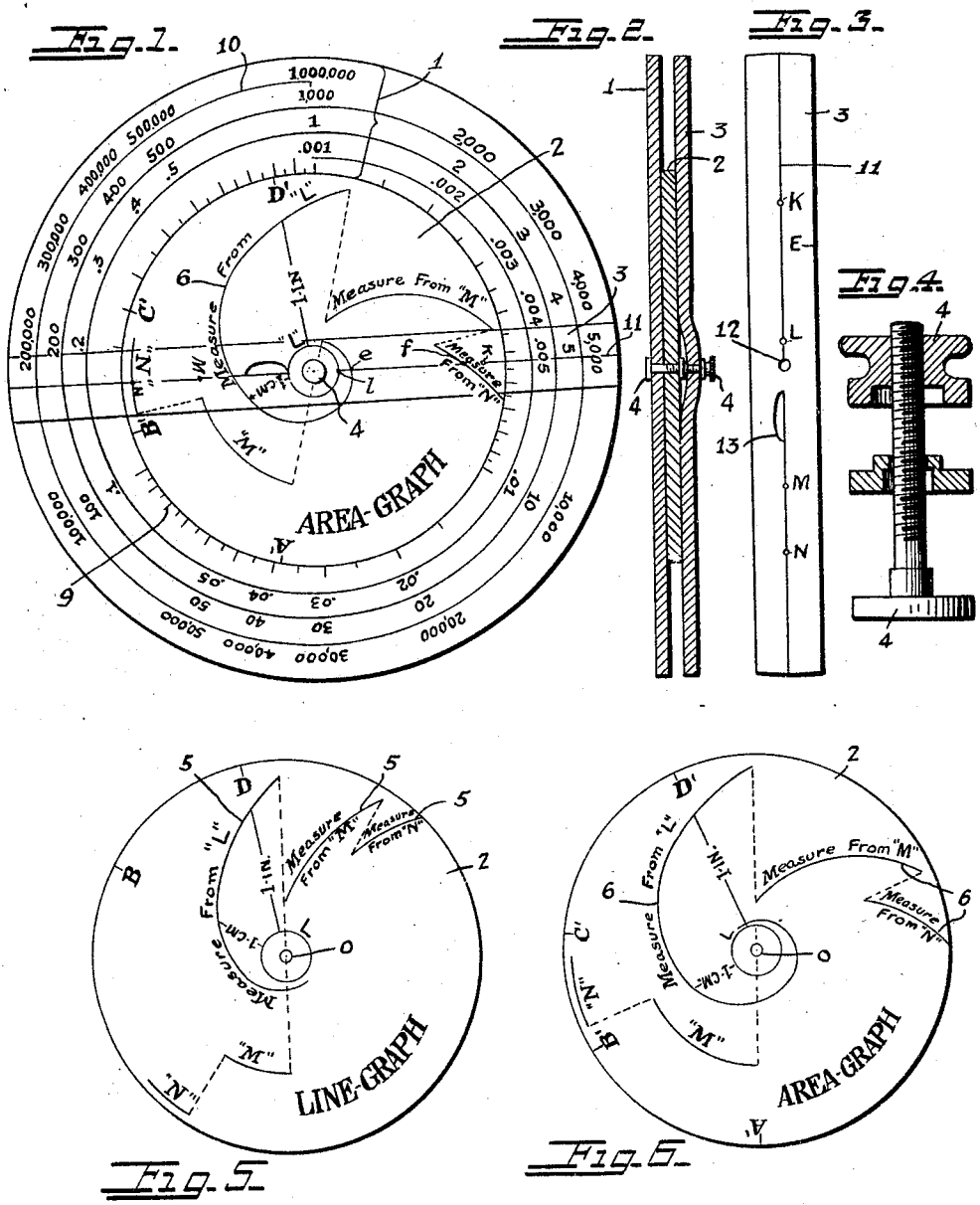
Inventor.
Samuel Whittemore Boggs Nov. 20, 1928.
S. W. BOGGS
1,692,326
DRAWING DEVICE
Filed Oct. 11, 1926
2 Sheets-Sheet 2
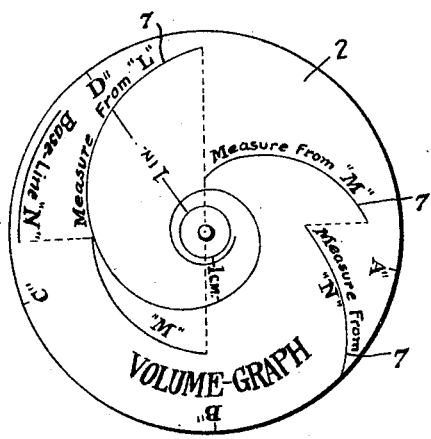
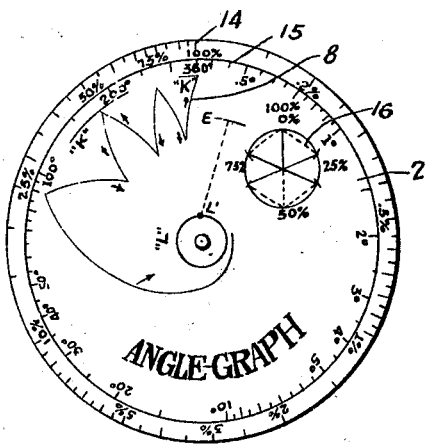
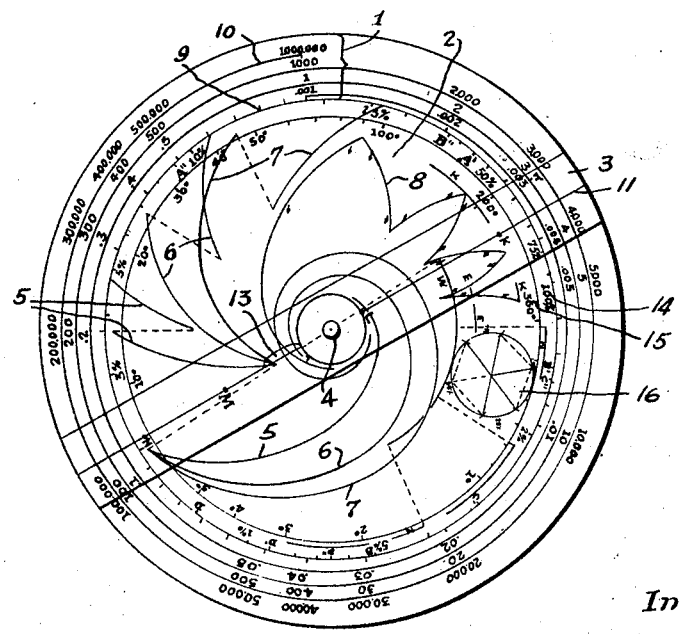
Inventor,
Samuel Whittemore Boggs Patented Nov. 20, 1928.

1,692,326

UNITED STATES PATENT OFFICE.

SAMUEL WHITTEMORE BOGGS, OF CHEVY CHASE, MARYLAND.

DRAWING DEVICE.

Application filed October 11, 1926. Serial No 140,941.

An object of my invention is to facilitate the construction of diagrams and other graphic illustrations, of all of the types employed to visualize the ratios between the several numerical quantities in any group or series. This object may be further clarified by stating that it is to eliminate both the computation of dimensions, and the measurement of such dimensions by means of rulers and the like, and to make it possible to take the dimension to be used in drafting, in each instance, directly under or opposite the number which it is intended to represent graphically, at the point where such number appears printed on a scale—by means of a compass, a pair of dividers, or similar instrument. It is an object to accomplish this result in respect of diagrams which employ simple lines, bars, or other linear comparisons; circles, squares, or other figures involving area comparisons; spheres, cubes, or other figures involving volume comparisons; and circular "pie diagrams" involving comparisons of angles or sectors.

A further object of my invention is to make it possible to determine, without any computation whatsoever, the quantity which is represented by each unit of length, area, volume, or angle, as the case may be, in any chart or diagram of the types herein referred to.

A further object of my invention is to make possible, or to facilitate, the construction of a square which is equivalent in area to any given circle, and vice versa, the construction of a cube which is equivalent in volume to any given sphere, and vice versa, and the construction of other regular geometrical forms and bodies of equivalent areas or volumes, without computation.

A further object of my invention is to simplify and expedite the construction of "pie diagrams" by providing simple graphic means of laying off the required angles without the use of a protractor of the usual type, and by making possible the simultaneous determination of percentages and of degrees of arc required to represent such percentages.

With the foregoing and related objects in view, my invention consists in the parts, elements, features of construction, and combinations herein set forth and claimed.

In the accompanying drawings, forming part of this application, I have shown a preferred embodiment of my invention for the purpose of affording an understanding thereof, but it is to be understood that the same is for the purpose of affording an understanding only, and not for limitation of the invention.

Fig. 1 is a face view of the device, in which 1 illustrates the essential part of a number disk member which is not shown separately in the drawings, and in which 2 is a smaller "graph disk" member on which is shown a curve, 6, which is only one of four curves on said "graph disk."

Fig. 2 is an elevation or cross sectional view.

Fig. 3 shows the indicator member, 3.

Fig. 4 illustrates the set screw, 4.

Fig. 5 shows disk 2, having a logarithmic spiral, 5.

Fig. 6 shows disk 2, having a square root logarithmic spiral, 6.

Fig. 7 shows disk 2, having a cube root logarithmic spiral, 7.

Fig. 8 shows disk 2, having two logarithmic scales and a curve, 8.

Fig. 9 is a face view of the complete device, having all four graphs (Figs. 5, 6, 7 and 8) assembled on a single disk-face.

Referring to Fig. 1, member 1 is a disk having a logarithmic scale, 9, around which the corresponding numbers are arranged on a spiral, 10. As illustrated, the logarithmic graduations from 1 to 10 are shown on an arc of 120°, so that in the full circumference there is represented a ratio of 1 to 1,000. Stated in terms of polar coordinates, $\theta = \frac{2\pi}{3} \log a$, where the angle $\theta$ is measured clockwise, and where $a$ is any positive real number. This is not an essential feature, but it is convenient in that if any or all of the numbers in a given series are not found printed around the spiral, the printed numbers may be multiplied, or divided, by 1,000, or by 1,000,000, or by any other multiple of 1,000, as required (or, more conveniently, the numbers to be graphically represented, may be similarly multiplied or divided)—as will be understood by all persons who are familiar with either logarithms or a slide rule. The spiral arrangement of the numbers is a feature which facilitates the reading of these numbers in their relations to the spiral curves 5, 6 and 7 on disks 2—the two or three intersections of a radial line with any spiral curve corresponding to numbers on disk 1 in the same radial order.

The "line-graph" spiral, 5, on the "graph disk" 2 (Fig. 5) is so constructed that the radial coordinates, measured from one of one or more circular base-lines (L, M, or N), are directly proportional to the numbers on the number disk 1, under or opposite which they appear in any position of disks 2 and 1 when positioned concentrically. Stated in terms of polar coordinates, $\theta = \frac{2\pi}{3} \log a$ (as on disk 1), and $\rho = c + ba$, where $a$ is any positive real number, $b$ is an arbitrary constant, and $c =$ either OL, $-$OM, or $-$ON, according as the portion of the curve is measured from base-line L, M, or N respectively.

As illustrated in Fig. 5, the primary base-line "L" is a small circle concentric with the perimeter of the disk, from which the radial coordinates are measured, increasing from a small interval until the spiral approaches the perimeter of the disk. The curve is then continued, measured from a secondary circular base-line "M", concentric with base-line "L", the measurements being across the center of the disk, until the spiral again approaches the perimeter, when it may be continued from a concentric tertiary circular base-line "N", which may be as close as practicable to the perimeter. By this means radial measurements may be taken from the curve varying all the way from an infinitesimal interval continuously up nearly to the diameter of the disk.

As shown on Fig. 5, the radial coordinates on the spiral which are equal to selected units of linear measure (1 cm. and 1 in.) are so indicated, and the corresponding points on the perimeter are marked and indicated B and D respectively.

The "area-graph" spiral, 6 on the "graph disk" 2 (Fig. 6) is similar in construction to the "line-graph" spiral, except that the radial coordinates are proportional to the square roots of the numbers on the number disk 1, under or opposite which they appear in any concentric position of disks 2 and 1; i. e., $\rho = c + \sqrt{ba}$, these terms being defined as above with reference to the "line-graph" spiral 5, on disk 2. Likewise the radial coordinates of 1 cm. and 1 in. are indicated, and marked B' and D' respectively on the perimeter. In addition, the radial coordinates which are equal to the radius of the circle whose area is 1, viz $1/\sqrt{\pi}$ are marked, for 1 sq. cm. at A', and for 1 sq. in. at C'.

The "volume-graph" spiral 7, on the "graph disk" 2 (Fig. 7) is exactly similar in construction to the "area-graph" spiral, except that the radial coordinates are proportional to the cube roots of numbers on the number disk 1, and that B" and D" indicate the radial coordinates of 1 cm. and 1 in. respectively and A" and C" indicate the radii of spheres whose volumes are 1 cu. cm. and 1 cu. in. respectively.

Fig. 8 shows on the "graph disk" 2, a curve 8 and two logarithmic scales 14 and 15. The curve 8, serves as a protractor in laying off any angle, as in the construction of "pie diagrams." The radial coordinates of the curve are equal to chords subtending arcs and angles on a "construction circle" the radius of which is exactly equal to L'E, the size of the angles being expressed by the numerical values on logarithmic scales 14 and 15. As illustrated, the curve is constructed with reference to two concentric circular base-lines, L and K, for the purpose of making the intersection of a radial line with the curve such as to admit of more precise measurement than would be possible with only one base-line.

The small circular diagram, 16, shows how to use the "angle-graph" as a protractor in laying off angles up to 360° (100%), by means of chords subtending arcs intercepted by radial lines. The purpose of diagram 16 is to show graphically that angles representing 0–25% (0°–90°) should be laid off by means of chords measured from "0%" (0°); angles representing 25%–75% (90°–270°) should be laid off by means of chords measured from "50%" (180°); and angles representing 75%–100% (270°–360°) by means of chords measured from "100%" (360°).

The outer logarithmic scale, 14, is graduated exactly like the number disk, 1, and is numbered to indicate percentages from 0.1 to 100. The inner scale, 15, is similarly graduated, and numbered to indicate degrees of arc from 0.36 to 360, and is so placed that 360° falls on the same radial line at 100%. In the construction of so-called "pie diagrams", therefore, and in all other calculations in which 360° = 100%, homologous numbers will be found on the same radial lines.

The combination of the area-graph spiral 8 and the logarithmic scales 14 and 15 constitutes in itself, therefore, both a protractor and a scale for converting degrees to percentages and vice versa.

The purpose of the indicator member, 3, (Fig. 3), is to indicate precisely the radial line which passes through any numerical value on the larger or "number disk" 1 and simultaneously through any curve or any graduations on "graph disk", 2. The indicator may be constructed either of a transparent material such as celluloid, or of metal. In the form illustrated in Fig. 3, it would necessarily consist of a transparent material, having a hair line, 11, passing through the center of the hole 12. The points marked K, L, M, and N, at the radial distances of the several base-lines similarly lettered on Figs. 5 to 9, have small depressions or holes to admit the point of a pair of compasses or dividers, thus facilitating precise readings on any of the curves. The short arc E, as measured from L, indicates the radius of the construction circle to be used with the protractor feature shown on Fig. 8. The hole or window, 13, admits precise readings from the curves in the smaller intervals, the indicator being revolved through 180° from the position in which it is otherwise utilized.

The set-screw member, 4, (Fig. 4), is so constructed that it may be used to hold the "number disk" 1 and the "graph disk" 2 firmly in any relative concentric position which is desired, while at the same time permitting the free revolution of the indicator.

In respect of all of the three spiral graphs 5, 6 and 7 (Figs. 5, 6 and 7 respectively), it may be noted that each spiral graph may be enlarged or reduced by photo-engraving or similar processes without change other than the appropriate revolution of the radial coordinates of 1 cm. and 1 in., and of the index marks on the perimeter (B, D, A', B', C', D', A'', B'', C'', and D''); all through the same angle. It is clear, also, that, in respect of each of the three spiral graphs, that that part of the curve measured from the tertiary base-line "N" may be omitted, as also that part measured from the secondary base-line "M".

In respect of the "number disk" 1, and of the "angle-graph" 8 (Figs. 1 and 8 respectively), it is likewise evident that both may be enlarged or reduced, by photo-engraving or similar processes, without the necessity of any change whatever.

It may be noted that any two, any three, or all four of the graphs and accompanying index marks and scales illustrated in the drawings (Figs. 5, 6, 7 and 8), may be assembled or combined on a single disk-face (as in Fig. 9), inasmuch as all four said graphs are analogous in construction and identical in operation in relation to the other members (disk 1, indicator member 3, and set-screw 4). For simplicity of illustration the four "graphs" are shown and described separately in these specifications and appended claims, but in manufacturing a marketable device it may be deemed practicable to combine all four said graphs and other indications and data either on one disk-face or on the two faces of a single disk.

The utility of my device may be demonstrated by showing some of the practical uses to which it may be put, as follows:

*I. Linear comparison diagrams.*

Using the "line-graph", 5 on disk 2 (Fig. 5) in combination with the number disk 1 (Fig. 1), the indicator (Fig. 3), and the set-screw (Fig. 4), the following things may be done, without any computation whatever, and without the use of a ruler graduated in units of linear measure, and with the aid of no more than a pair of compasses or of dividers, a square, and a straight-edge:

1. A series of lines, or linear comparisons of any sort, (bars, etc.), may be laid out which are proportional in length to the numbers in any numerical series.

2. A series of lines may be laid out on any desired linear scale (e. g., 1 inch = 724).

3. The linear scale of any chart employing linear comparisons of any sort may be determined with the aid of a pair of dividers or compasses only.

*II. Area comparison diagrams.*

Using the "area-graph" 6 on disk 2 (Fig. 6) in combination with the number disk, the indicator, and the set-screw, the following things may be done, without computation and without the use of a ruler, and with the aid of no more than a pair of compasses or of dividers, a square, and a straight-edge:

1. A series of circles, of squares, of equilateral triangles, or of other regular polygons, may be laid out which are proportional in area to the numbers in any numerical series.

2. A series of circles, or of squares, may be laid out on any desired area scale (e. g., 1 sq. cm. = 512.3).

3. The area scale of any chart employing area comparisons in circles or squares may be determined with the aid of a pair of dividers or compasses only.

4. A square may be constructed equal in area to any given circle, and vice versa.

5. A series of geometrical figures, comprising both circles and squares, may be laid out which are proportional in area to the numbers in any numerical series.

6. A series of lines may be laid out which are proportional to the square roots of the numbers in any numerical series.

*III. Volume comparison diagrams and solids.*

Using the "volume-graph", 7, on disk 2 (Fig. 7) in combination with the number disk, the indicator, and the set-screw, a series of operations may be performed entirely analogous to the above list in respect of areas, substituting "volumes" for "areas," "spheres" for "circles," "cubes" for "squares," and "cube roots" for "square roots."

*IV. "Pie diagrams," etc.*

Using the "angle-graph" (Fig. 8) with the indicator and the set-screw (without the number disk 1), the following things may be done without computation and without the use of any other protractor (using in addition only a pair of compasses and a straightedge in some instances);

1. The angle, measured in degrees of arc, required to represent any percentage (where 360° represents 100%) may be read directly.

2. Any angle, which is expressed either in degrees, or in percentages (i. e., in hundredth parts of a circumference), may be constructed.

3. Any angle which has been constructed may be read or determined in terms of either degrees or percentages or both.

Using the number disk 1 in combination with the "angle-graph", the indicator, and the set-screw, in the following additional things may be done:

1. A series of angles proportional to the numbers in any numerical series may be read in terms of either degrees or percentages.

2. Such a series of angles may be constructed.

3. In constructing a series of angles proportional to the numbers in any numerical series, each angle may be read both in degrees and percentages, and also constructed by means of a chord subtending an arc, all from a single setting of the two disks in the proper relative concentric position.

The utility of my device may be more clearly understood from a number of examples. In each of the examples given below, one of the four graphs on disk 2 is employed, disk 2 being associated concentrically with disk 1, and with the indicator member 3, by means of the set-screw 4. It is believed that the five examples given below will sufficiently illustrate how my device should be employed and operated in putting it to all of the practical uses previously described.

V. Examples.

1. Suppose that it be desired to construct three circles to represent the ratios between 5.25, 5,250, and 2,712, the area scale being 1 sq. in.=250.

For circles (as for squares, triangles, and other geometrical figures in two dimensions) use the "area-graph", in association with the members indicated above. The set-screw being not tightened, revolve disk 2 in relation to disk 1 until $C'$ (the radius of a circle whose area is 1 sq. in.) is on the reading 250 on disk 1 (as illustrated in Fig. 1). Tighten the set-screw so as to hold the two disks firmly in that relative position. Revolve the indicator 3 until the reference line 11 is on the reading, on disk 1, of the first number to be represented, viz 5.25 (as in Fig. 1). Then, with the point of a pair of compasses placed in the indicator depression at L (at $l$ on Fig. 1), spread the compasses until the pencil or pen point is on the "area-graph" curve at the appropriate point under the indicator reference line (at $e$ on Fig. 1). With $le$ as a radius, swing a circle representing 5.25. Then, as the second number 5,250, is read on the same graduation on disk 1, on the next spiral reading radially outward from, or above, the reading 5.25, the point to be used on the "area-graph" curve will be that next radially outward from $e$, viz $f$, (as illustrated in Fig. 1). As $f$ is on that part of the curve which is constructed with reference to base-line "N", the compass point should be placed in $n$ (Fig. 1). With $nf$ as a radius, then swing a circle representing 5,250. To represent the third number, revolve the indicator until the reference line is on the reading 2,712 (on disk 1); then, since that part of the curve is constructed from base-line "M", take the radius from "M" on the indicator to the point on the outer curve which is under the reference line and swing a circle.

2. Suppose that it be desired to construct three circles to represent the ratios between $641,000, $227,100, and $108,000, and that it be desired to represent the larger quantity by a circle of no particular precise radius but which, for purposes of illustration and statement, may be 1.25 inches.

Again using the area-graph, the two disks being free to revolve (the set-screw not being tightened), set the indicator reference line at $641,000, and hold it in that position by grasping the indicator and the edge of disk 1 between thumb and finger. With a pair of compasses or dividers set at 1.25 inches, and one point being placed at L on the indicator, revolve the "graph" disk member 2 until the "area-graph" curve intersects the indicator reference line at 1.25 inches, and then, with the set-screw, clamp the two disks rigidly together. Then proceed to take off radii from the curve as in Example 1.

3. Suppose that it be desired to ascertain the area scale in any series of circles representing a series of numbers.

Using the "area-graph" (as in previous examples), so position the two disks that the radius of any circle (as measured on the indicator reference line by means of a pair of dividers) and the numerical quantity which it represents are found simultaneously under the reference line of the indicator. The area scale in units per sq. in. may then be read on disk 1, at $C'$ (on disk 2), and the area scale may likewise be read simultaneously, on disk 1, in units per sq. cm., at $A'$ (on disk 2).

4. Suppose that it be desired to construct a square which is equal in area to a given circle (whose radius is, say 0.8 inch).

Using the "area-graph", first set $A'$, or $C'$, (on disk 2) at a convenient reading on disk 1, say at 10. Then revolve the indicator member until the "area-graph" coordinate under the reference line, measured from L by means of a pair of dividers, measures 0.8 inch. Hold the indicator and disk 1 between thumb and finger; revolve disk 2 counter-clockwise until B', or D', (according to whether A', or C', was previously used) is at the same reading on disk 1 (as 10 above); then construct a square whose sides are equal to the "area-graph" coordinate which is found under the reference line on the indicator, the latter still being held firmly in the same position with reference to disk 1.

5. Suppose that it be desired to represent $5,700, $2,350, and $7,050, by sectors of a circle which are proportional in area to the several quantities, their total, $15,100, being represented by a complete circle whose radius is 1 inch.

First, construct a circle with a 1 inch radius, and, concentrically with it, a "construction circle" with a radius exactly equal to LE on the indicator member.

Using the "angle-graph" 8 on disk 2 (Figs. 8 and 9) set 100% (on logarithmic scale 14) at 15,100 on disk 1, and tighten the set-screw.

Revolve the indicator to 5,700 on disk 1, and on disk 2, scale 14, note the reading 37.7%. Holding the indicator and disk 1 in that relative position between thumb and finger, with a compass take off the "angle-graph" interval measured under the indicator reference line, from base-line L (as shown by arrows on the curve), and, on the "construction circle," lay off a chord measured counter-clockwise from the 50% point (diametrically opposite the 0% point) as shown on diagram 16, Fig. 8.

Next, revolve the indicator to 2,350 on disk 1, and on disk 2, scale 14, note the reading 15.6%. Taking the chord interval, as explained in the next preceding paragraph, lay it off on the "construction circle" clockwise from the 37.7% point previously laid off.

Then revolve the indicator to 7,050, note the reading 46.7%, and, from base-line "K" (as indicated by arrows on the "angle-graph") lay off the chord interval taken from the "angle-graph", in a counter-clockwise direction from the "50%" point on the "construction circle" (i. e., diametrically opposite the chord just previously laid off). Finding that the last chord coincides with the 100% point or starting point, and that the construction therefore "closes" without rechecking or adjustment, radii should then be drawn through the points on the "construction circle" as indicated by the chords laid off, extending the radii to intersect the circle of 1 inch radius.

Adding the percentages 37.7, 15.6, and 46.7, to make certain that they total 100.0, it is found that no adjustment is necessary.

Erase the "construction circle" and other construction lines.

I claim:

1. A drawing device comprising in combination a member having an edge provided with logarithmic graduations, a second member carried thereby and movable relative thereto and provided with a base line and a plurality of logarithmic curves spaced from said base line proportional to measurements of lines, areas, volumes, and angles, respectively, and cooperating with said graduations on said first member, and an indicator member which is movable over both said two first-mentioned members by means of which to take off at any relative setting of said two first-mentioned members a series of coordinates of the curves on said second member corresponding to the numerical values of said graduations on said first member.

2. A drawing device comprising in combination a disk having logarithmic graduations near the periphery thereof, a second disk having a base circle and a plurality of logarithmic curves spaced with reference to linear measurements, areas, volumes, and angles, respectively, cooperating with said graduations on said first disk at any relative setting of the two said disks, means concentric with each disk for pivotally connecting the two, and an indicator pivoted on said means whereby at any relative setting of the two said disks a series of coordinates on said second disk corresponding to numerical values of said graduations on said first disk may be taken off.

3. In a drawing device, a member having an edge provided with logarithmic graduations, a second member carried thereby and movable relative thereto and provided with a base line and a logarithmic curve cooperating with said graduations on said first member, said curve being so constructed that the distances between said base line and said curve are directly proportional to the numerical values of the graduations on the first said member at any relative setting of the two said members, and an indicator member which is movable over both said two first-mentioned members by means of which to take off at any relative setting of said two first-mentioned members a series of said distances on said second member corresponding to said numerical values of said logarithmic graduations on said first member.

4. In a drawing device, a disk having logarithmic graduations near the periphery thereof, a second disk having a base circle and a logarithmic spiral thereon such that the distances which are measured on a diameter between said circle and said spiral are directly proportonal to the numerical values of the graduations on the first disk at any relative setting of the two said disks, means concentric with each disk for pivotally connecting the two, and an indicator pivoted on said means whereby at any relative setting of the two said disks a series of said distances on said second disk corresponding to said numerical values of said graduations on said first disk may be taken off.

5. In a drawing device, a member having an edge provided with logarithmic graduations, a second member carried thereby and movable relative thereto and provided with a base line and a logarithmic curve cooperating with said graduations on said first member, said curve being so constructed that the distances between said base line and said curve are directly proportional to the square roots of the numerical values of the graduations on the first said member at any relative setting of the two said members, and an indicator member which is movable over both said two first-mentioned members by means of which to take off at any relative setting of said two first-mentioned members a series of said distances on said second member corresponding to said square roots of the numerical values of said logarithmic graduations on said first member.

6. In a drawing device, a disk having logarithmic graduations near the periphery thereof, a second disk having a base circle and a logarithmic spiral thereon such that the distances which are measured on a diameter between said circle and said spiral are directly proportional to the square roots of the numerical values of the graduations on the first disk at any relative setting of the two said disks, means concentric with each disk for pivotally connecting the two, and an indicator pivoted on said means whereby at any relative setting of the two said disks a series of said distances on said second disk corresponding to said square roots of the numerical values of said graduations on said first disk may be taken off.

7. In a drawing device, a member having an edge provided with logarithmic graduations, a second member carried thereby and movable relative thereto and provided with a base line and a logarithmic curve cooperating with said graduations on said first member, said curve being so constructed that the distances between said base line and said curve are directly proportional to the cube roots of the numerical values of the graduations on the first said member at any relative setting of the two said members, and an indicator member which is movable over both said two first-mentioned members by means of which to take off at any relative setting of said two first-mentioned members a series of said distances on said second member corresponding to said cube roots of the numerical values of said logarithmic graduations on said first member.

8. In a drawing device, a disk having logarithmic graduations near the periphery thereof, a second disk having a base circle and a logarithmic spiral thereon such that the distances which are measured on a diameter between said circle and said spiral are directly proportional to the cube roots of the numerical values of the graduations on the first disk at any relative setting of the two said disks, means concentric with each disk for pivotally connecting the two, and an indicator pivoted on said means whereby at any relative setting of the two said disks a series of said distances on said second disk corresponding to said cube roots of the numerical values of said graduations on said first disk may be taken off.

9. In a drawing device, a member having an edge provided with logarithmic graduations, a second member carried thereby and movable relative thereto and having logarithmic graduations corresponding exactly to the graduations on said first member but numbered to indicate degrees of arc up to 360°, said second member having also a base line and a curve which is so constructed that the coordinates of said curve as measured from said base line are exactly equal to the chords of a circle of prescribed radius subtending arcs which are also subtended by angles as expressed in degrees on said degree scale, and an indicator member which is movable over both said two first-mentioned members by means of which to take off at any relative setting of said two first mentioned members a series of said coordinates of the curve on said second member corresponding to the numerical values on either of said logarithmic scales.

10. In a drawing device, a disk having logarithmic graduations near the periphery thereof, a second disk coacting therewith having logarithmic graduations corresponding exactly to the graduations on said first disk but numbered to indicate percentages up to 100%, said second disk having also a second series of logarithmic graduations numbered to indicate degrees of arc up to 360°, said two logarithmic scales on said second disk being so disposed that the 100% and the 360° graduations fall on the same radial line, said second disk having also a curve so constructed that the radial coordinates measured in the direction indicated from a selected one of two concentric circular base lines are exactly equal to the chords of a circle of prescribed radius subtending arcs which are also subtended by angles as expressed in degrees on said logarithmic degree scale on said second disk, a set-screw on which said disks are mounted concentrically, and an indicator member pivoted on said set-screw by means of which to take off at any relative setting of the two said disks a series of said radial coordinates on said curve corresponding to the numerical values on said logarithmic scales.

11. In a drawing device one member of which consists of a disk having thereon a logarithmic spiral the maximum development of which involves a series of circular base lines on said disk concentric with said disk and with each other, said logarithmic spiral being developed first radially outwardly from the circular base line of smallest radius until it closely approaches the periphery of the disk, then diametrically through the center of the disk from the circular base line of next larger radius until it again approaches the periphery of the disk, and finally diametrically through the center of the disk from the circular base line of greatest radius until it reaches the periphery of the disk.

12. In a drawing device, a disk having formed thereon a curve the radius vector coordinate of which for certain portions of said curve exceeds the radius of said disk, the radius vector coordinate of said portions of said curve being measured on diametrical lines passing through the center of the disk from a selected one of a plurality of base circles of different radii in an indicated sequence, and an indicator pivotally supported at the center of said disk and having a diametrical indicating line, said indicator having reference marks formed on said line at points over said base circles whereby coordinates of corresponding portions of said curve may be taken off.

13. In a drawing device, a combination comprising a form of protractor consisting of a disk, an indicator, and means concentric with said disk for pivotally associating said disk and said indicator, said disk having a logarithmically graduated and numbered scale to indicate measurements of angles in numerical terms, and having also a curve which is so constructed that the radial coordinates of said curve as measured in the direction indicated from one of two concentric circular base lines thereon are exactly equal to the chords of a circle of prescribed radius subtending arcs which are also subtended by angles as expressed in said numerical terms on said logarithmically graduated and numbered scale, said indicator being adapted to indicate straight lines passing through the center of said disk whereby said radial coordinates and said numerical values which are on the same radial line on said disk may be taken off.

14. In a drawing device one member of which consists of a disk having logarithmic graduations near the periphery thereof, a second member of which consists of a disk cooperating with said first disk rotatably relative thereto on a pivot and having a logarithmic spiral which intersects a given radial line more than once, a spiral on said first disk around which the numerical values of said logarithmic graduations are indicated whereby at any relative setting of the two said disks a series of radial coordinates of said logarithmic spiral on said second disk corresponding to the appropriate numerical values on said first disk may be taken off, and an indicator member adapted to reading said radial coordinate on said second member and the corresponding numerical value on said first disk which fall on the same radial line at any relative setting of said disks.

15. A drawing device comprising in combination a disk having logarithmic graduations and corresponding numerical values indicated near the periphery thereof, a second disk having a plurality of logarithmic curves the radial coordinates of which as measured from a selected one of a plurality of base circles are proportional to homologous dimensions of similar geometrical figures and bodies involving comparisons of lines, areas, volumes, and angles, respectively, said second disk having also a plurality of peripheral reference marks which are the terminations of the radial lines passing through points on said curves the radial coordinates of which are equivalent to selected standard units of measure, said curves and said peripheral reference marks cooperating with said graduations and numerical values on said first disk at any relative setting of the two said disks, a set-screw pivotally connecting the two disks concentrically and adapted to hold said disks firmly at any desired relative setting of said disks, and an indicator member revolving freely on said set-screw at all times and adapted to indicate straight lines passing through the center of said disks and to receive the point of a pair of compasses precisely on each one of said plurality of base circles on said second disk.

16. A drawing device comprising a disk of limited radius having formed thereon a polar curve, all portions of the curve having radius vectors less than the radius of the disk being developed outwardly from a base circle of small diameter at the center of the disk, and all portions of the curve having radius vectors substantially equal to and greater than the radius of the disk being developed through the center of the disk from the inside of base circles of larger diameters.

17. An article of manufacture comprising an element having a polar curve formed thereon within a circle of limited radius, the curve being developed initially outwardly from a circular base-line of small radius to a point near the periphery of said circle, and being continued from a point on the same radial line with the last mentioned point in such manner that the distances measured radially from said small circular base-line to points on said curve are less than the corresponding radial coordinates of the respective points by a constant value.

18. An article of manufacture comprising an element having a polar curve formed thereon within a circle of limited radius, the said curve being first developed radially outwardly from a base circle of small radius to a point near the periphery of the circle and being continued thereafter diametrically through the center of the base circle successively from each of a plurality of base circles of increasing radii concentric with the first base circle.

19. An article of manufacture comprising an element having a polar curve formed thereon within a limited area, all portions of the curve having points of radius vectors less than a value determined by the limits of the area, being developed outwardly from a base circle of small diameter as the origin of the curve, and all portions whose points have radius vectors substantially equal to or greater than the said value being developed through the center of the origin circle from base circles of larger diameters.

SAMUEL WHITTEMORE BOGGS.